United States Patent [19]

Beyer et al.

[11] Patent Number: 4,531,125
[45] Date of Patent: Jul. 23, 1985

[54] THREE-DIMENSIONAL AIR SPACE SURVEILLANCE RADAR

[75] Inventors: Guenter Beyer, Gilching; Rudolf Hauptmann, Dachau; Rainer Peters, Unterhaching, all of Fed. Rep. of Germany

[73] Assignee: Siemens Aktiengesellschaft, Berlin & Munich, Fed. Rep. of Germany

[21] Appl. No.: 392,749

[22] Filed: Jun. 28, 1982

[30] Foreign Application Priority Data

Jul. 27, 1981 [DE] Fed. Rep. of Germany ....... 3129492

[51] Int. Cl.³ .............................................. G01S 13/72
[52] U.S. Cl. .................................... 343/7.9; 343/758; 343/426
[58] Field of Search ..................... 343/7.9, 6 R, 16 M, 343/10, 11, 7.4, 425, 426, 758, 9

[56] References Cited

U.S. PATENT DOCUMENTS

| 4,090,201 | 5/1978 | Whitman, Jr. | 343/7.4 X |
| 4,158,840 | 6/1979 | Schwab | 343/7.9 X |
| 4,224,618 | 9/1980 | Rich et al. | 343/7.9 X |

Primary Examiner—T. H. Tubbesing
Assistant Examiner—John B. Sotomayor
Attorney, Agent, or Firm—Hill, Van Santen, Steadman & Simpson

[57] ABSTRACT

A three-dimensional air space surveillance radar in which the radar receiver is connected to a target tracking means which stores target data and does extrapolation of target data for target trace formations, including a panoramic antenna which illuminates the entire elevation range to be covered and has a reception lobe at the elevation level which can be electronically or mechanically controlled such that a line air space scanning occurs during the course of normally sequence scanning programs. The line-shaped beam of the antenna is briefly interrupted in the invention from the normal reception lobe elevation angle when the tracker determines that a target echo is expected from a different elevation angle than that being scanned. During such scanning interrupt, the reception lobe is switched to the expected elevation angle of the target and in the invention, the data acquisition rate for the tracker is increased relative to known prior art three-dimensional surveillance radars which function on a strictly time sequential manner. The precision of the invention is retained and the invention is utilized in a tracker-equipped three-dimentional air space surveillance radar of high trace quality such as used, for example, in air defense radar.

4 Claims, 4 Drawing Figures

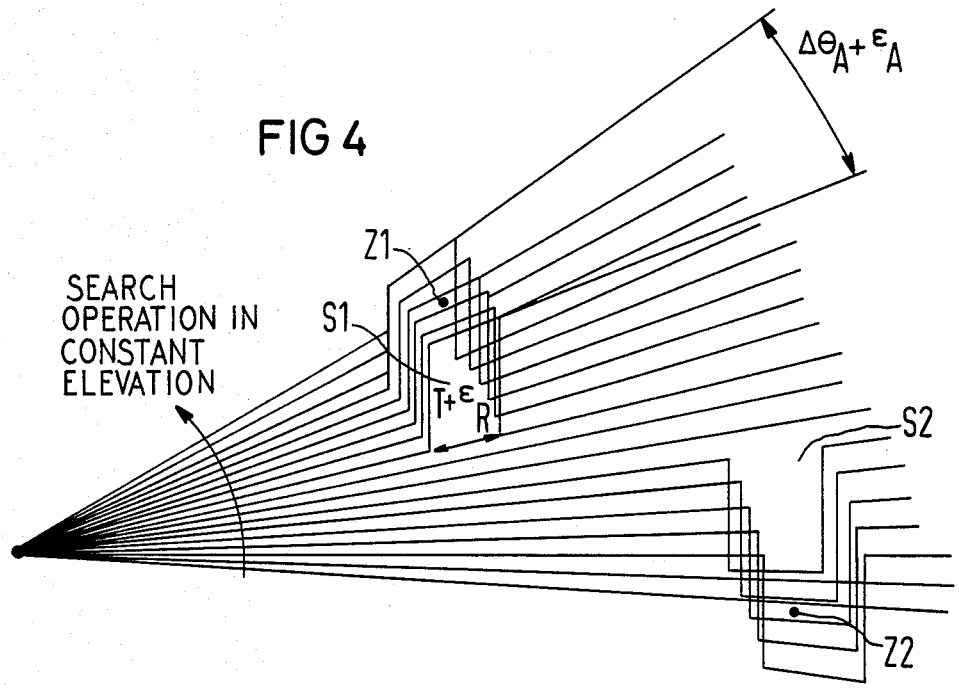

THREE-DIMENSIONAL AIR SPACE SURVEILLANCE RADAR

BACKGROUND OF THE INVENTION

1. Field of the Invention

This invention relates in general to a three-dimensional air space surveillance radar and in particular to an improved radar system.

2. Description of the Prior Art

Three-dimensional air space surveillance radar is known in which the narrow beam surveillance radar antenna consecutively scans different azimuths at one elevation and switches to another elevation and continues this procedure up to the maximum elevation.

SUMMARY OF THE INVENTION

In the present invention, the radar receiver is connected to signal processing means and includes a tracker with data storage and which has a radar data signal processor for extracting parameters of a target and in which all measured target data such as range, azimuth and elevation are stored and data is extrapolated which relates to targets for which a trace has already been formed. The invention includes a panoramic antenna which rotates about a vertical axis of rotation which scans the air space to be monitored in the entire elevation range with a broad band elevation covering beam at every antenna revolution and which also has a pencil beam receiving lobe which is electronically and/or mechanically controlled in elevation and is mechanically controlled by the rotational motion of the azimuth drive. As the azimuth scanning pencil beam-like reception mode scans at a fixed elevation, it momentarily changes to a different elevation when data and information from the target tracking means indicates that a target exists at a different elevation than that which is presently being scanned. After passing such target, the narrow beam antenna switches back to the same elevation as it was before the change and continues scanning. The invention allows the data renewal rate to be increased, due to the fact that by changing the elevation of the narrow beam antenna to known target positions allows more information to be received from such targets which increases the target illumination time and, thus, increases and improves the resolution of the trace of the target.

When the entire air space which is being monitored is scanned and on a time sequential basis, than the data renewal rate is equal to $$\Delta\theta_A \cdot \Delta\theta_E / (TOT \cdot 360 \cdot \theta_{Emax})$$

In this equation, TOT represents the target illumination time which is equal to N/PRF which equals the pulse repetition frequency where N pulses are required for after-integration.

$\Delta\theta_A$ is equal to the antenna aperture in azimuth in degrees.

$\Delta\theta_E$ is equal to the antenna aperture in elevation in degrees.

$\theta_{Emax}$ is equal to the maximum altitude coverage in degrees.

As seen from this equation, the data renewal rate depends on the azimuth and elevation resolutions. When using high resolution, the data renewal rate becomes very small. When a tracker is connected to the radar, the quality of its track depends on the precision of the target data and on the data renewal rate. The demand for high precision of three-dimensional acquisition radar using one-dimensional altitude scanning, however, is incompatible with a requirement for a high data renewal rate.

It has been known in the prior art to maintain the target illumination time small, so that the number of pulses N required for after integration is kept low. This, however, means that high transmission power must be utilized so as to achieve the necessary range. Also, the suppression of clutter deteriorates. In the present invention, scanning of the entire air space volume can result in obtaining the same resolution. In some areas, for example, at greater elevation angles a rougher resolution may occur and less precision can be accepted in such areas.

In contrast with a three-dimensional air space surveillance radar, according to the invention it is an object to increase the data renewal rate for the target tracking means while retaining the same precision.

This objective is achieved in the invention in that the elevation angle of the receiving lobe is controlled by means of a device for altitude control such that during a normal sequencing scanning program, the elevation angle remains constant during an antenna revolution and is moved to a new value at the beginning of the next antenna resolution so that a line-like air space scanning results. In the invention, a brief interruption of the normally sequencing scanning program is provided which is activated in time ranges in which on the basis of target data determined in the tracking target means target echoes can be expected from an elevation angle which is different from the elevation angle currently being scanned in the normal scanning program and furthermore during such interruption the target altitude data determined in the target tracking means is supplied to the means for altitude control so that the receiving lobe elevation angle of the expected target echo is obtained during this interruption.

Thus, the expected target can be scanned after each antenna revolution and not only when it would occur as a result of the normally sequencing scanning program for the line-shaped air space scanning without significant gaps occurring in the search operation. Thus, the date of renewal rate increases by the factor of $\theta_{Emax}/\Delta\theta_E$.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 4 is an oblique view of the search operation of a constant elevation with search gaps in which a change to a different elevation angle is accomplished for the purpose of target data renewal in the invention.

DESCRIPTION OF THE PREFERRED EMBODIMENTS

Figure 1:
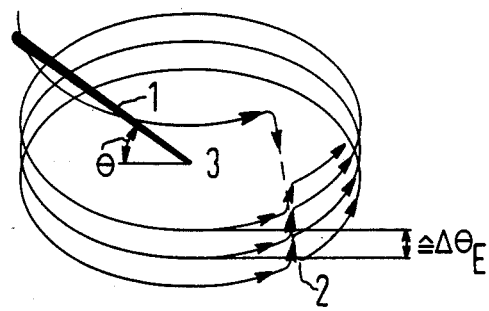
FIG. 1 is a perspective view illustrating the receiving lobe scanning during a normally sequencing scanning program.

FIG. 1 comprises a perspective view for illustrating the principle of a scanning antenna lobe 1 using normal scanning sequential programming. The elevation angle $\theta_E$ of the pencil-shaped beam receiving lobe 1 remains constant during each antenna revolution and shifts to a new value at the beginning of successive antenna rotation with each shift being equal to a change of $\Delta \theta_E$. Thus, this allows all elements about the receiver to be scanned by using the successive shifts in elevation. The azimuth position at which the elevation angle changes always occurs at the same point and is indicated by 2 in FIG. 1. The receiving lobe 1 relative to the receiver center antenna position 3 rotates counterclockwise in the illustrated example and makes a shift upwardly by the angle $\Delta\theta_E$ at azimuth position 2 after each revolution. Such line-like scanning occurs up to the maximum elevation angle of $\theta_{Emax}$. When the rotation has ended at the maximum elevation angle position $\theta_{Emax}$ then the receiving lobe 1 shifts back to the initial lowest elevation position and the scanning operation occurs again from the bottom to the top. In this system, since the elevation angle changes only at point 2 and remains constant for 360 degrees scan for targets in the receiving region of the antenna echoes will be received only when the elevation of the antenna lobe 1 coincides with the elevation of the target.

Figure 2:
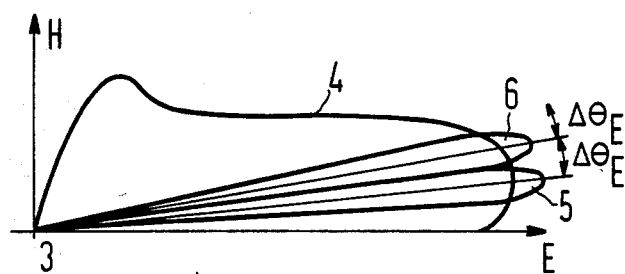
FIG. 2 is a radiation pattern and receiving lobe scanning in the elevation plane.

FIG. 2 comprises a vertical section where the abscissa is equal to the range E and the ordinate is equal to the altitude H through the illumination pattern 4 transmitted from the antenna position 3 and through two receiving lobe patterns 5 and 6 which are separate elevation patterns which successively occur at the same elevation position after one antenna revolution. The two receiving lobes 5 and 6 deviate from each other by $\Delta \theta_E$ relative to the elevation angle. Since each target to be tracked should emit echo signals for each antenna revolution, it is a precondition for the functioning of the three-dimensional surveillance radar according to the invention that the air space to be monitored is covered over the entire elevation range by a fan beam-like illumination pattern 4 during each antenna revolution of the panorama antenna. A cosec$^2$ pattern can, for example, be utilized as the radiation pattern for this purpose.

Figure 3:
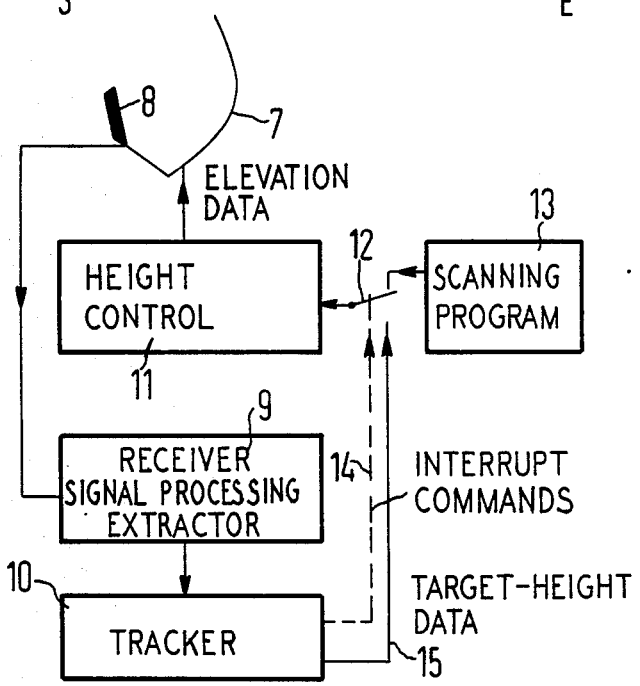
FIG. 3 is a block diagram of the receiving means of the invention of a three-dimensional air space surveillance radar.

FIG. 3 comprises a block diagram of the receiving and evaluation part of a three-dimensional surveillance radar according to the invention. As is conventionally done, the echo signals are supplied from a receiver 9 with signal processing and target extracting means which are supplied to the receiver from a panorama antenna 7. The antenna 7 rotates about a vertical axis for azimuth scanning and has elevation scanning which occurs in the above described line-wise manner by electronic means for example which phase controls a primary radiator row 8 or by means of so-called stack beams or the like. A tracker 10 includes a target tracking means wherein all of the measured target data such as range, azimuth and elevation are stored and wherein data is extrapolated for those targets for which a trace has already been constructed. The elevation angle of the receiving lobe of the panoramic antenna 7 is controlled by the altitude control device 11. The feed of the normally sequencing scanning program is controlled with the change-over means 12 which is operated by the scanning program means 13. The program generates a line-like scanning of the air space with a pencil-shaped beam as illustrated in FIG. 1. The change-over means 12 is switched off by the scanning program means 13 through a control line 14 which is connected to the tracker 10 in such time ranges during which on the basis of the target data determined in the tracker 10 target echoes can be expected at elevation angles which differ from the elevation angle existing during the normal scanning program sequence. Thus, the interrupt commands interrupt the normal sequencing scanning program over the control line 14. During such interrupt period, the change-over means switches over to a data line 15 and transmits the target altitude data determined in the target tracker 10 for a previously detected target to the device 10 for altitude control so that the receiving lobe elevation angle of the previously received target echo will be received during this interrupt period. During such interrupt thus the search operations sequencing by fixed elevation is shut-off and for the purposes of renewing or acquiring the data of a previously detected target, the antenna is briefly switched over to the elevation angle of this previously detected target. This allows the previously detected target to be renewed so that higher data renewal rate occurs in the invention and in the prior art systems.

FIG. 4 is a perspective view illustrating the antenna pattern of the three-dimensional air surveillance radar according to the invention. A search operation occurs at a constant elevation and is illustrated. The scanning of the air space sequences as described in conjunction with FIG. 1 wherein the antenna rotates and after each rotation it is shifted a fixed elevation angle for the next scan. For a given elevation angle of $\theta_E$ and an azimuth angle of $\theta_A$ a target echo is registered at the distance of $\tau$ from the transmit pulse corresponding to the range of R. During the next antenna revolution, the beam of the receiving antenna will change to the elevation angle position of $\theta_E \pm \Delta\theta_E$. When the elevation angle $\theta_A - (-\Delta\theta_A/2 + \epsilon/2)$ is exceeded, then the elevation angle of the receiving antenna will be set back to the elevation angle position $\theta_E$ during the time interval from $\tau - (T/2 + \epsilon_R/2)$ through $\tau + (T/2 + \epsilon_R/2)$. The return will be suppressed when the azimuth becomes greater than $\theta_A + (\Delta\theta_A/2 + \epsilon_A/2)$. Such operation will be repeated at random elevation angles of $\theta_E \pm n \cdot \Delta\theta_E$ where n is a whole number. Thus, T is the width of the transmit pulse, $\epsilon_A$ is the expectation angle interval in azimuth after an antenna revolution and $\epsilon_R$ is the expectation range interval corresponding to the time interval after an antenna revolution. Thus, the targets such as targets Z1 and Z2 in the example, can be scanned after each antenna revolution without significant gaps occurring in the search operation since after the target is scanned the scanning returns to the normal elevation angle. Such gaps are illustrated in FIG. 4 as S1 and S2. This changing of elevation angle where known targets exist raises the data renewal rate by a factor $\theta_{Emax}/\Delta\theta_E$. Thus, it is seen that in this invention each known target is scanned on each revolution of the antenna and, thus, the data renewal rate is substantially reduced over those systems of the prior art.

Although the invention has been described with respect to preferred embodiments, it is not to be so limited as changes and modifications can be made which are within the full intended scope of the invention as defined by the appended claims.

We claim as our invention:
1. A three-dimensional air space surveillance radar with a target tracking means which is connected to a radar data signal processing means with target parameter extraction and in which all measured target data, namely, range, azimuth and elevation are stored and those data are extrapolated for targets for which a trace has already been formed, and comprising, a panorama antenna which rotates around a vertical axis and which illuminates the air space to be monitored over its entire elevation range to be covered with a broad elevation coverage beam during each antenna revolution and which has a pencil-shaped reception lobe which is electronically and/or mechanically controlled in elevation and is mechanically controlled in the azimuth level due to the rotational movement, the improvement comprising, the elevation angle ($\theta_E$) of the pencil-shaped reception lobe (1) is controlled by altitude control means (11), such that during a normally sequencing scanning program that it remains constant during an antenna revolution and moves to a new elevation at the beginning of the next antenna revolution so that a line-shaped air space scanning results further including an electronic switch (12) for the brief interruption of the normally sequencing scanning program (13) and said electronic switch (12) for brief interruption is closed during such time ranges in which, on the basis of the target data determined by the target tracking means (10) where known target echoes occur from an elevation angle which differs from the current elevation angle during the normal scanning program and during such an interrupt, the target altitude data determined by the target tracking means (10) are supplied to said altitude control means (11) for altitude control so that the reception lobe elevation angle of the respectively expected target echo is switched on during said interrupt.

2. A three-dimensional air space surveillance radar comprising, a panorama antenna supported for azimuth scanning and having two radiations patterns, one of which covers a large elevation angle and the other which has a narrow elevation antenna pattern, means for driving said antenna in azimuth, a receiver with signal processing and a target extractor connected to said antenna, a target tracking means connected to said receiver and extracting and storing target data, means for controlling the elevation of said narrow elevation antenna pattern and normally maintaining it constant during an azimuth scan and receiving an input from said target tracking means and shifting it momentarily to a different elevation when the azimuth is at a position where a target exists.

3. A surveillance radar according to claim 2 wherein said means for driving said antenna in azimuth rotates said antenna and said means for controlling said antenna in elevation holds the antenna at a constant elevation for one revolution and incrementally shifts the antenna in elevation at the beginning at each revolution.

4. A surveillance radar according to claim 3 wherein said means controlling elevation of said narrow antenna pattern momentarily shifts said antenna to a different elevation for a time equal to the time required to scan the target.

* * * * *